(12) United States Patent
Jose et al.

(10) Patent No.: US 10,912,026 B2
(45) Date of Patent: Feb. 2, 2021

(54) POWER-EFFICIENT MECHANISM FOR MULTI-LINK OPERATION IN MOBILE COMMUNICATIONS

(71) Applicant: MediaTek Singapore Pte. Ltd., Singapore (SG)

(72) Inventors: Pradeep Jose, Cambridge (GB); Pavan Santhana Krishna Nuggehalli, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/358,684

(22) Filed: Mar. 19, 2019

(65) Prior Publication Data

US 2019/0297571 A1   Sep. 26, 2019

Related U.S. Application Data

(60) Provisional application No. 62/645,872, filed on Mar. 21, 2018.

(51) Int. Cl.

| | | |
|---|---|---|
| *H04L 12/28* | (2006.01) | |
| *H04W 52/02* | (2009.01) | |
| *H04W 76/15* | (2018.01) | |
| *H04W 76/28* | (2018.01) | |
| *H04W 72/04* | (2009.01) | |
| *H04W 76/25* | (2018.01) | |

(52) U.S. Cl.
CPC ..... *H04W 52/0209* (2013.01); *H04W 72/042* (2013.01); *H04W 76/15* (2018.02); *H04W 76/25* (2018.02); *H04W 76/28* (2018.02)

(58) Field of Classification Search
CPC ........................................................ H04L 12/28
USPC ........................................................ 370/329
See application file for complete search history.

(56) References Cited

U.S. PATENT DOCUMENTS

| | | |
|---|---|---|
| 2012/0044847 A1 | 2/2012 | Chang |
| 2015/0257198 A1 | 9/2015 | Su |
| 2017/0238252 A1 | 8/2017 | Dalsgaard et al. |
| 2017/0325164 A1 | 11/2017 | Lee et al. |
| 2019/0220703 A1* | 7/2019 | Prakash ................ G06F 9/5044 |

OTHER PUBLICATIONS

USPTO, International Search Report and Written Opinion for International Patent Application No. PCT/US2019/023095, dated Jun. 12, 2019.

* cited by examiner

*Primary Examiner* — Dang T Ton

(74) *Attorney, Agent, or Firm* — Han IP PLLC; Andy M. Han

(57) ABSTRACT

Various solutions for power-efficient mechanism for multi-link operation with respect to user equipment and network apparatus in mobile communications are described. An apparatus may establish a first link and a second link with at least one of a plurality of network nodes. The apparatus may monitor the first link. The apparatus may stop monitoring the second link. The apparatus may determine whether a condition is triggered on the first link. The apparatus may activate the second link in response to the condition being triggered on the first link.

18 Claims, 4 Drawing Sheets

POWER-EFFICIENT MECHANISM FOR MULTI-LINK OPERATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/645,872, filed on 21 Mar. 2018, the content of which is incorporated by reference in its entirety.

TECHNICAL FIELD

The present disclosure is generally related to mobile communications and, more particularly, to power-efficient mechanism for multi-link operation with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), Carrier Aggregation (CA) or Dual/Multi Connectivity (DC/MC) is introduced to facilitate uplink and/or downlink data transmission. CA or DC/MC may increase the ability of the user equipment (UE) to transmit and receive data on more than one links. This may allow the UE to exchange data with the network at higher speeds. However, it comes at the cost of increased power consumption. Furthermore, the activation of DC/MC or CA takes significant amounts of time. These delays may result in slow initial data transfer on the primary carrier before additional carriers can be activated, leading to a poor end user experience. To counter such delay, some networks tend to keep the additional carriers active even when no data is expected, exacerbating the power consumption of the UE.

Accordingly, how the UE can reduce power consumption when the multi-link operation is configured is important in power saving issues. Therefore, it is needed to provide proper power-efficient mechanisms and enhanced power saving schemes for the multi-link operation.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to power-efficient mechanism for multi-link operation with respect to user equipment and network apparatus in mobile communications.

In one aspect, a method may involve an apparatus establishing a first link and a second link with at least one of a plurality of network nodes. The method may also involve the apparatus monitoring the first link. The method may further involve the apparatus stopping monitoring the second link. The method may further involve the apparatus determining whether a condition is triggered on the first link. The method may further involve the apparatus activating the second link in response to the condition being triggered on the first link.

In one aspect, an apparatus may comprise a transceiver capable of wirelessly communicating with a plurality of network nodes of a wireless network. The apparatus may also comprise a processor communicatively coupled to the transceiver. The processor may be capable of establishing a first link and a second link with at least one of network nodes. The processor may also be capable of monitoring the first link. The processor may further be capable of stopping monitoring the second link. The processor may further be capable of determining whether a condition is triggered on the first link. The processor may further be capable of activating the second link in response to the condition being triggered on the first link.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power-efficient mechanism for multi-link operation with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, CA or DC/MC operation is introduced to facilitate uplink and/or downlink data transmission. CA or DC/MC may increase the ability of the UE to transmit and receive data on more than one links. This may allow the UE to exchange data with the network at higher speeds. However, it comes at the cost of increased power consumption. Furthermore, the activation of DC/MC or CA takes significant amounts of time. These delays may result in slow initial data transfer on the primary carrier before additional carriers can be activated, leading to a poor end user experience. To counter such delay, some networks tend to keep the additional carriers active even when no data is expected, exacerbating the power consumption of the UE.

In view of the above, the present disclosure proposes a number of schemes regarding power-efficient mechanism for multi-link operation with respect to the UE and the network apparatus. According to the schemes of the present disclosure, the UE may be able to deactivate at least one additional link to reduce power consumption when no data is expected on the additional link. The UE may also be able to activate the additional link to increase data throughput when data is expected on the additional link.

Figure 1:
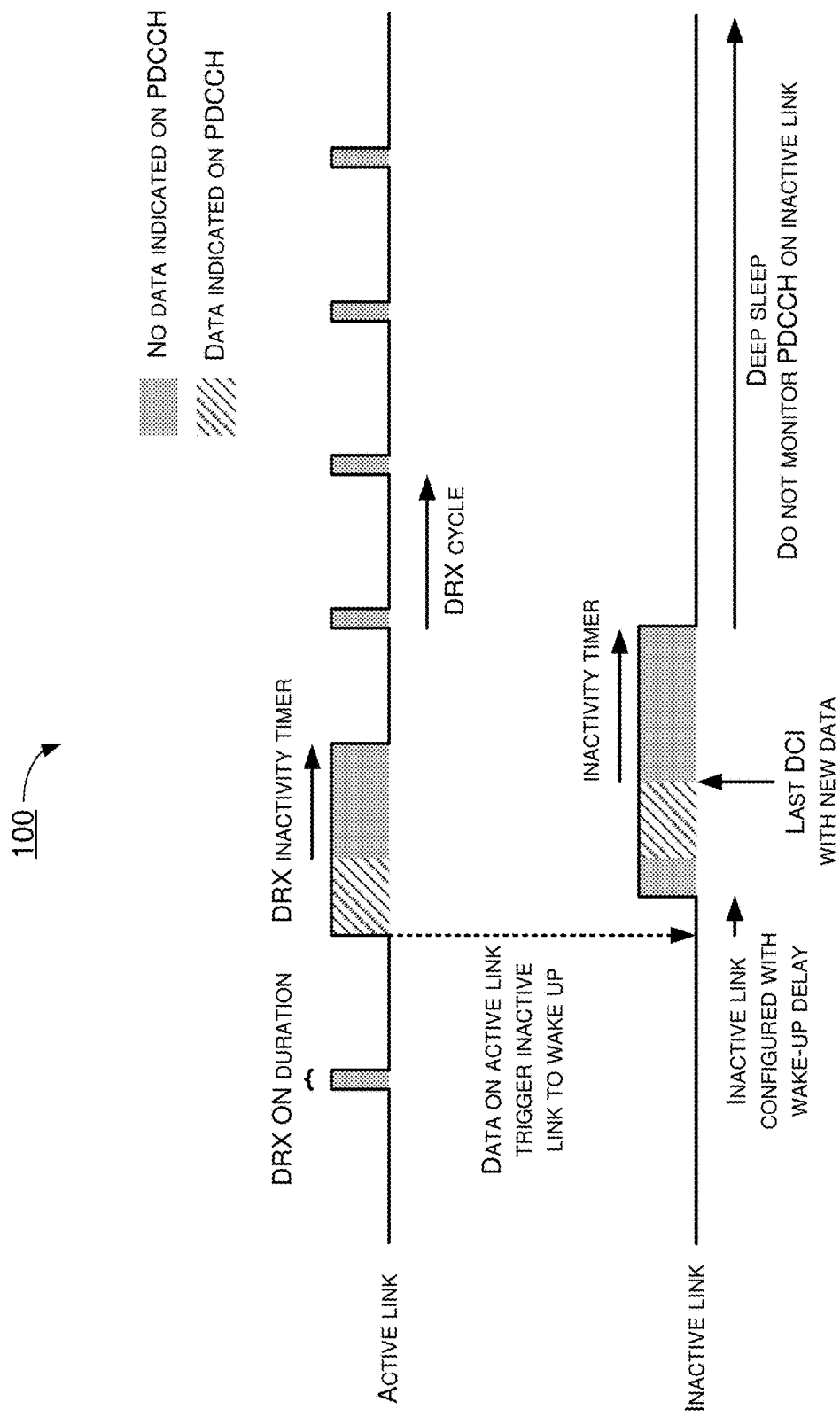
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a plurality of network nodes, which may be a part of a wireless communication network (e.g., an LTE network, an LTE-Advanced network, an LTE-Advanced Pro network, a 5G network, an NR network, an IoT network or an NB-IoT network). In scenario 100, CA and/or DC/MC operation may be configured to the UE. The UE may be configured to establish a first link with a first network node. The first network node may comprise a primary cell (PCell), a primary secondary cell (PSCell), or a master cell group (MCG). The first link may be a primary component carrier. The UE may further be configured to establish a second link with a second network node. The second network node may comprise a secondary cell (SCell) or a secondary cell group (SCG). The second link may be a secondary component carrier. Alternatively, the UE may be configured to establish the first link and the second with the same network node.

The first link may be an active link. The UE may be configured to monitor the first link for activity. For example, the UE may monitor a PDCCH, a downlink control information (DCI), a wakeup signal, or any data activity on the first link. When discontinuous reception (DRX) is configured on the first link, the UE may be configured to periodically monitor the first link in the DRX ON duration based on the DRX cycle. In an event that there is no data indicated/received during the DRX ON duration, the UE may enter into a sleep mode and stop monitoring the first link in the DRX OFF duration. In an event that there is data indicated/received during the DRX ON duration, the UE may enter into a wakeup mode and keep monitoring the first link for a period of time. Alternatively, when DRX is not configured on the first link, the UE may be configured to keep monitoring the first link without entering into a sleep mode.

The second link may be an inactive link. The DRX may not be configured on the second link. The UE may be configured to stop monitoring the second link. Specifically, the UE may be configured to deactivate a cell group (e.g., SCG), deactivate a carrier (e.g., secondary component carrier), switch a carrier to a dormant state, switch a carrier to a bandwidth part (BWP) without PDCCH reception, or stop monitoring a PDCCH on the second link. When the UE is configured to stop monitoring the second link, the UE may be able to turn off a part of hardware/software components to reduce power consumption. For example, the UE may turn off a part of antennas, radio frequency (RF) front-end components, or processing units for power saving.

The UE may be configured to determine whether a condition is triggered on the first link. The condition may comprise at least one of presence of a downlink or uplink activity on a PDCCH, entry into a specific bandwidth part, reception of a network indication, transmission of a specific amount of data, transmission of a specific type of traffic, and reception of a wakeup indication. Specifically, when the condition is triggered on the first link, it means that there is data activity (e.g., downlink data or uplink data transmission) expected between the UE and the network nodes, or the network node plans to send data on the inactive link. The UE should wake up the additional link (e.g., second link) to increase the data throughput for the possible data transmission. For example, the arrival of data on the active link, or a DCI/medium access control (MAC) control element (CE) received on the active link may be used to wake up the inactive link.

The UE may be configured to activate the second link in response to the condition being triggered on the first link. Specifically, the UE may be configured to activate a cell (e.g., SCG), activate a carrier (e.g., secondary component carrier), switch a carrier to an active state, switch a carrier to a specific bandwidth part, or start monitoring a PDCCH. When the UE is configured to activate the second link, the UE may be able to turn on all or a part of hardware/software components to increase data throughput. For example, the UE may turn on all or a part of antennas, RF front-end components, or processing units for receiving/transmitting the downlink/uplink data.

The UE may be configured to activate the second link immediately after the condition is triggered on the first link. Alternatively, the UE may be configured to activate the second link after a predetermined/configured delay. After the activation of the second link, the UE may be configured to receive data on the second link. The UE may further be configured to initiate an inactivity timer after the activation of the second link or after reception of the data (e.g., after last DCI). Before the expiration of the inactivity timer, the UE may be configured to keep monitoring the second link for possible data transmission. The inactivity timer may be restarted whenever there is data activity on the second link. When the inactivity timer is expired, the UE may be configured to stop monitoring the second link. The UE may enter into a deep sleep mode and be configured not to monitor the PDCCH on the second link for power saving.

Figure 2:
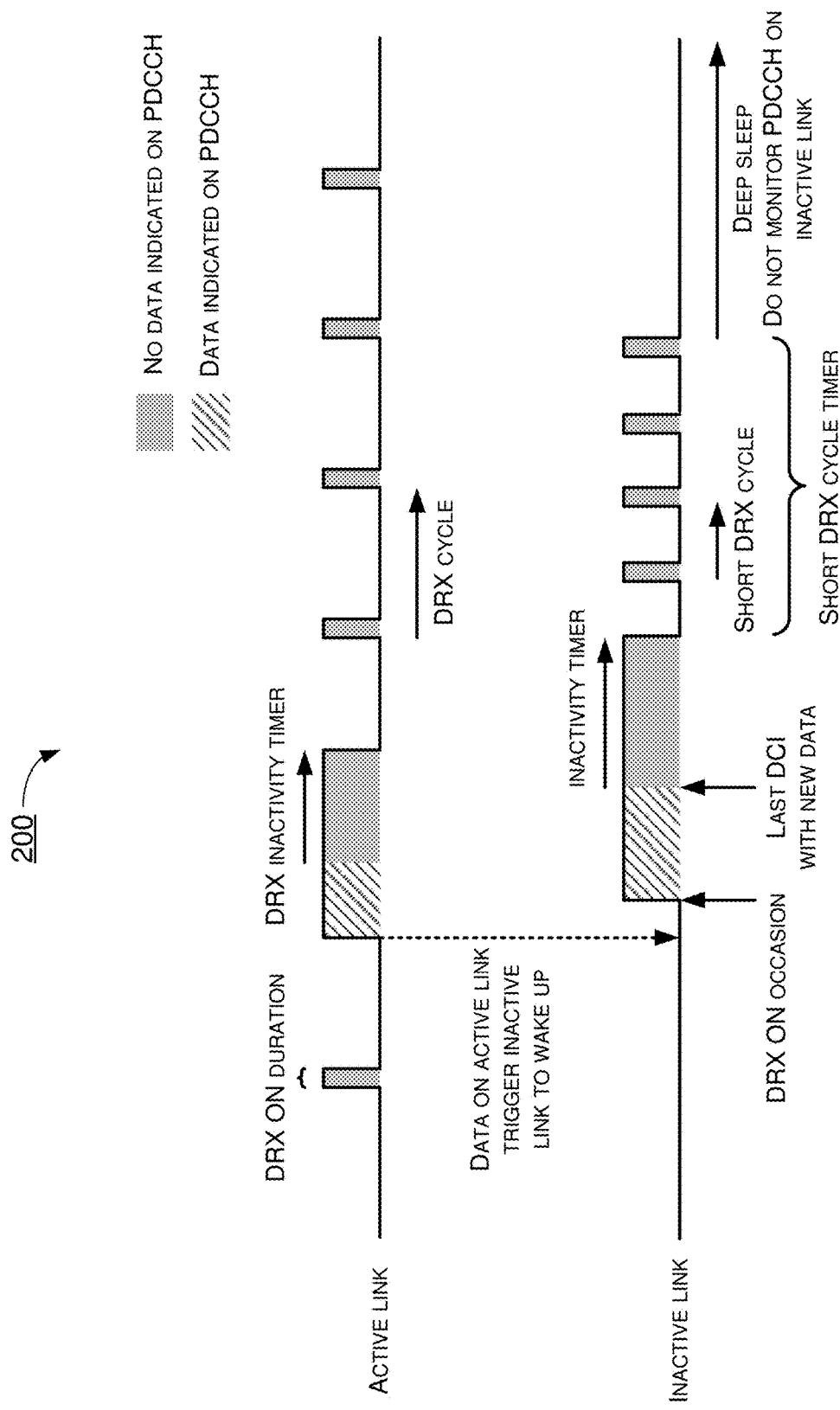
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a plurality of network nodes, which may be a part of a wireless communication network (e.g., an LTE network, an LTE-Advanced network, an LTE-Advanced Pro network, a 5G network, an NR network, an IoT network or an NB-IoT network). In scenario 200, the DRX may be configured on the first link and the second link. The UE may be configured to periodically monitor the first link in the DRX ON duration based on the DRX cycle. The UE may be configured with a long DRX period and a short DRX period on the second link. In the long DRX period, the UE may enter into a deep sleep mode and be configured to stop monitoring the second link. In the short DRX period, the UE may be configured to periodically monitor the second link in the DRX ON duration based on the short DRX cycle.

The first link may be an active link. The second link may be an inactive link. After establishing the first link and the second link, the UE may be configured to monitor the first link and stop monitoring the second link. The UE may be configured to determine whether a condition is triggered on the first link. The condition may comprise at least one of presence of a downlink or uplink activity on a PDCCH, entry into a specific bandwidth part, reception of a network indication, transmission of a specific amount of data, transmission of a specific type of traffic, and reception of a wakeup indication. Specifically, when the condition is triggered on the first link, it means that there is data activity (e.g., downlink data or uplink data transmission) expected between the UE and the network nodes, or the network node plans to send data on the inactive link. The UE should wake up the additional link (e.g., second link) to increase the data throughput for the possible data transmission. For example, the arrival of data on the active link, or a DCI/MAC CE received on the active link may be used to wake up the inactive link.

The UE may be configured to activate the second link in response to the condition being triggered on the first link. The UE may not activate the second link immediately after the condition is triggered on the first link. The UE may be configured to activate the second link with a delay until the next DRX ON occasion. Such delay may be minimised by coordinating the DRX occasions between the first link and the second link. Upon the DRX ON occasion, the UE may be configured to activate the second link and receive data on the second link. The UE may further be configured to initiate an inactivity timer after the activation of the second link or after reception of the data (e.g., after last DCI). Before the expiration of the inactivity timer, the UE may be configured to keep activating the second link for possible data transmission. The inactivity timer may be restarted whenever there is data activity on the second link. When the inactivity timer is expired, the UE may be configured to enter into the short DRX period. In the short DRX period, the UE may be configured to periodically monitor the second link in the DRX ON duration based on the short DRX cycle. The UE may be configured to initiate a short DRX cycle timer after entering the short DRX period. When the short DRX cycle timer is expired, the UE may be configured to stop monitoring the second link. The UE may enter into the long DRX period or the deep sleep mode.

In some implementations, when no data activity is expected by the UE, the UE may be configured to stop monitoring the additional link (e.g., second link). The data inactivity may be determined according to, for example and without limitation, DRX inactivity timer expiry, transition from short to long DRX, go-to-sleep indications, or entry into a power saving state. When the data inactivity is determined on the first link or the second link, the UE may determine to stop monitoring the second link.

In some implementations, the network node may be able to be aware of that the UE is monitoring the inactive link. For example, the UE may start monitoring the inactive link after a fixed/predetermined time from the trigger on the active link. The fixed/predetermined time may be configured by the network node. The fixed/predetermined time value may be determined according to the X2 delay between the two links. Alternatively, the inactivity timer may be configured by the network node. For example, the inactivity timer may be determined according to variance in X2 delay. Alternatively, the UE may be configured to transmit an indication to inform at least one of the network nodes that the inactive link is activated and the UE is monitoring the inactive link. The indication may comprise, for example and without limitation, a service request (SR) or a random-access channel (RACH) request.

In some implementations, in an event that data only arrive on the inactive link, some mechanisms may be used to activate the inactive link. For uplink, the SR or RACH mechanism may be used. For downlink, a notification such as a dummy grant or a special DCI on the active link can be sent to wake up the inactive link.

In some implementations, deactivation of the additional link may be modelled as the switching of the carrier to a state in which PDCCH is not monitored, but link maintenance such as channel state information (CSI) and sounding reference signal (SRS) reporting still takes place. Such behavior may be modelled as a dormant state for the carrier, or by switching to a dormant BWP on which PDCCH monitoring is not configured. Alternatively, the UE may simply stop monitoring the PDCCH for the carrier. Deactivation of additional links may also trigger the UE to switch from dual or multi connectivity to single connectivity operation.

In some implementations, activation of the additional link need not take place each time when there is activity on the PCell or PSCell. It may depend on the amount of data expected to be exchanged. For example, in an event that the UE receives more than a specific amount of data on the downlink or has more than a specific amount of data to transmit on the uplink, it may act as a trigger for the UE to activate the additional link. Similarly, in an event that certain high volume traffic types are linked to a logical channel or a group of logical channels, data arrival on these logical channel(s) may trigger activation of the additional link. For example, in an event that data from a specific logical channel is received on the downlink, or data from a specific logical channel is present for transmission in the UE, these may trigger the activation of the additional link. In another example, for some types of traffic such as video streaming or data downloads, it is beneficial to transfer the data as quickly as possible and therefore activate all available carriers. For other traffic types such as voice over NR (VoNR), activation of additional carriers provide little benefit and may lead to a significant increase in power consumption. The network node may know about the amount of data, or the availability of data on a logical channel from uplink transmissions such as a buffer status report (BSR) or a transport block transmission. Once the additional link is activated, the network node may be informed that the UE is monitoring the additional link with an indication from the UE such as a transmission of a scheduling request or a RACH request.

Illustrative Implementations

Figure 3:
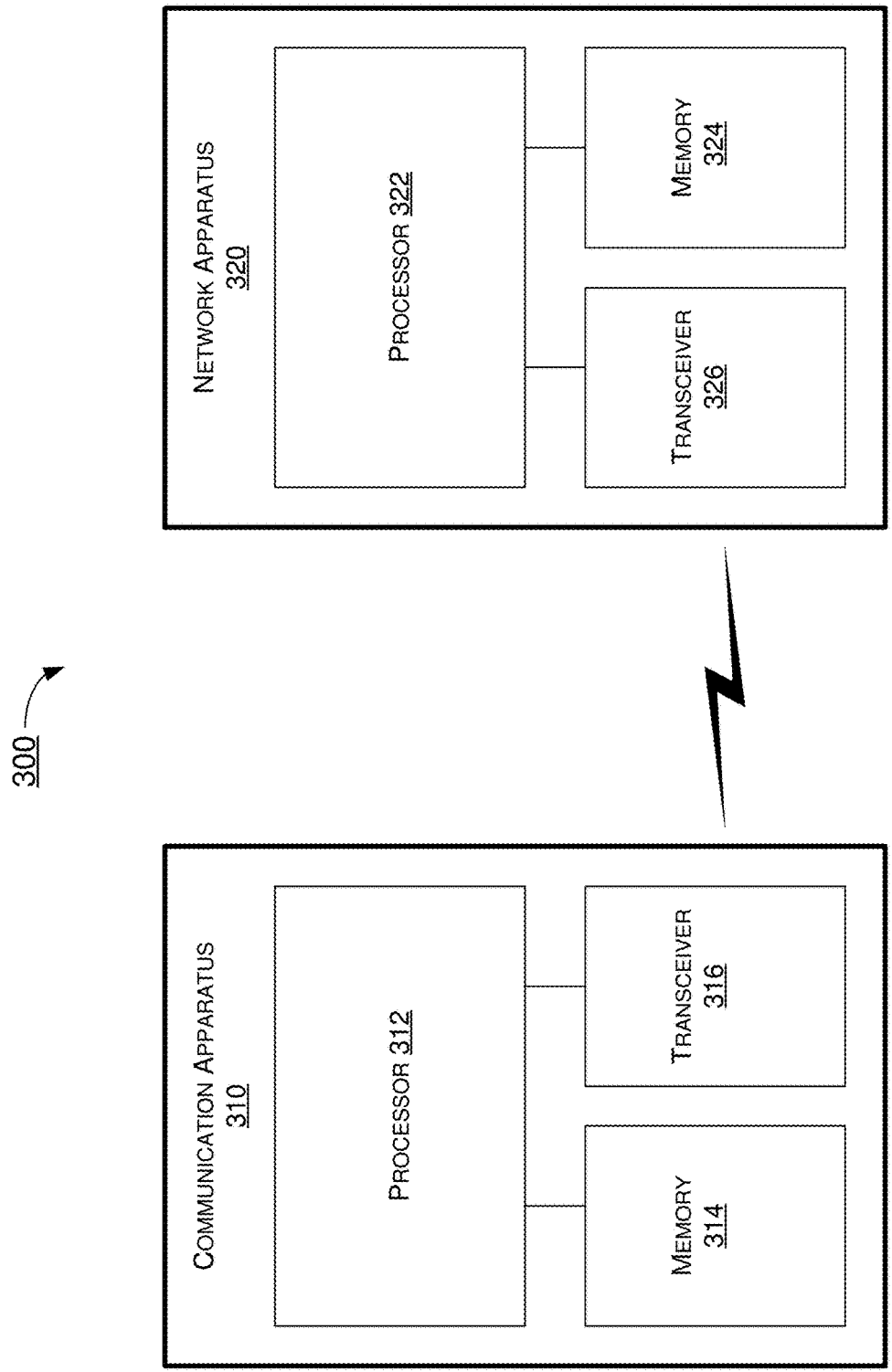
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to power-efficient mechanism for multi-link operation with respect to user equipment and network apparatus in wireless communications, including scenarios 100 and 200 described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more RISC or CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, CA and/or DC/MC operation may be configured to communication apparatus 310. Processor 312 may be configured to establish, via transceiver 316, a first link with a first network apparatus (e.g., network apparatus 320). The first network apparatus may comprise a PCell, a PSCell, or a MCG. The first link may be a primary component carrier. Processor 312 may further be configured to establish, via transceiver 316, a second link with a second network apparatus. The second network apparatus may comprise a SCell or a SCG. The second link may be a secondary component carrier. Alternatively, processor 312 may be configured to establish, via transceiver 316, the first link and the second with the same network apparatus.

In some implementations, the first link may be an active link. Processor 312 may be configured to monitor, via transceiver 316, the first link for activity. For example, processor 312 may monitor a PDCCH, a DCI, a wakeup signal, or any data activity on the first link. When DRX is configured on the first link, processor 312 may be configured to periodically monitor the first link in the DRX ON duration based on the DRX cycle. In an event that there is no data indicated/received during the DRX ON duration, processor 312 may enter into a sleep mode and stop monitoring the first link in the DRX OFF duration. In an event that there is data indicated/received during the DRX ON duration, processor 312 may enter into a wakeup mode and keep monitoring the first link for a period of time. Alternatively, when DRX is not configured on the first link, processor 312 may be configured to keep monitoring the first link without entering into a sleep mode.

In some implementations, the second link may be an inactive link. Processor 312 may be configured to stop monitoring the second link. Specifically, processor 312 may be configured to deactivate a cell group (e.g., SCG), deactivate a carrier (e.g., secondary component carrier), switch a carrier to a dormant state, switch a carrier to a BWP without PDCCH reception, or stop monitoring a PDCCH on the second link. When processor 312 is configured to stop monitoring the second link, processor 312 may be able to turn off a part of hardware/software components to reduce power consumption. For example, processor 312 may turn off a part of units in transceiver 316 for power saving.

In some implementations, processor 312 may be configured to determine whether a condition is triggered on the first link. The condition may comprise at least one of presence of a downlink or uplink activity on a PDCCH, entry into a specific bandwidth part, reception of a network indication, transmission of a specific amount of data, transmission of a specific type of traffic, and reception of a wakeup indication. Specifically, when the condition is triggered on the first link, it means that there is data activity (e.g., downlink data or uplink data transmission) expected between communication apparatus 310 and network apparatus 320, or the network plans to send data on the inactive link. Processor 312 should wake up the additional link (e.g., second link) to increase the data throughput for the possible data transmission.

In some implementations, processor 312 may be configured to activate the second link in response to the condition being triggered on the first link. Specifically, processor 312 may be configured to activate a cell (e.g., SCG), activate a carrier (e.g., secondary component carrier), switch a carrier to an active state, switch a carrier to a specific bandwidth part, or start monitoring a PDCCH. When processor 312 is configured to activate the second link, processor 312 may be able to turn on all or a part of hardware/software components to increase data throughput. For example, the UE may turn on all or a part of units in transceiver 316 for receiving/transmitting the downlink/uplink data.

In some implementations, processor 312 may be configured to activate the second link immediately after the condition is triggered on the first link. Alternatively, processor 312 may be configured to activate the second link after a predetermined/configured delay. After the activation of the second link, processor 312 may be configured to receive data on the second link. Processor 312 may further be configured to initiate an inactivity timer after the activation of the second link or after reception of the data (e.g., after last DCI). Before the expiration of the inactivity timer, processor 312 may be configured to keep monitoring the second link for possible data transmission. The inactivity timer may be restarted whenever there is data activity on the second link. When the inactivity timer is expired, processor 312 may be configured to stop monitoring the second link. Processor 312 may enter into a deep sleep mode and be configured not to monitor the PDCCH on the second link for power saving.

In some implementations, the DRX may be configured on the first link and the second link. Processor 312 may be configured to periodically monitor, via transceiver 316, the first link in the DRX ON duration based on the DRX cycle. Processor 312 may be configured with a long DRX period and a short DRX period on the second link. In the long DRX period, processor 312 may enter into a deep sleep mode and be configured to stop monitoring the second link. In the short DRX period, processor 312 may be configured to periodically monitor the second link in the DRX ON duration based on the short DRX cycle.

In some implementations, after establishing the first link and the second link, processor 312 may be configured to monitor the first link and stop monitoring the second link. Processor 312 may be configured to determine whether a condition is triggered on the first link. When the condition is triggered on the first link, it means that there is data activity (e.g., downlink data or uplink data transmission) expected between communication apparatus 310 and the network, or the network plans to send data on the inactive link. Processor 312 should wake up the additional link (e.g., second link) to increase the data throughput for the possible data transmission.

In some implementations, processor 312 may be configured to activate the second link in response to the condition being triggered on the first link. Processor 312 may not activate the second link immediately after the condition is triggered on the first link. Processor 312 may be configured to activate the second link with a delay until the next DRX ON occasion. Upon the DRX ON occasion, processor 312 may be configured to activate the second link and receive data on the second link. Processor 312 may further be configured to initiate an inactivity timer after the activation of the second link or after reception of the data (e.g., after last DCI). Before the expiration of the inactivity timer, processor 312 may be configured to keep activating the second link for possible data transmission. The inactivity timer may be restarted whenever there is data activity on the second link. When the inactivity timer is expired, processor 312 may be configured to enter into the short DRX period. In the short DRX period, processor 312 may be configured to periodically monitor, via transceiver 316, the second link in the DRX ON duration based on the short DRX cycle. Processor 312 may be configured to initiate a short DRX cycle timer after entering the short DRX period. When the short DRX cycle timer is expired, processor 312 may be configured to stop monitoring the second link. Processor 312 may enter into the long DRX period or the deep sleep mode.

Illustrative Processes

Figure 4:
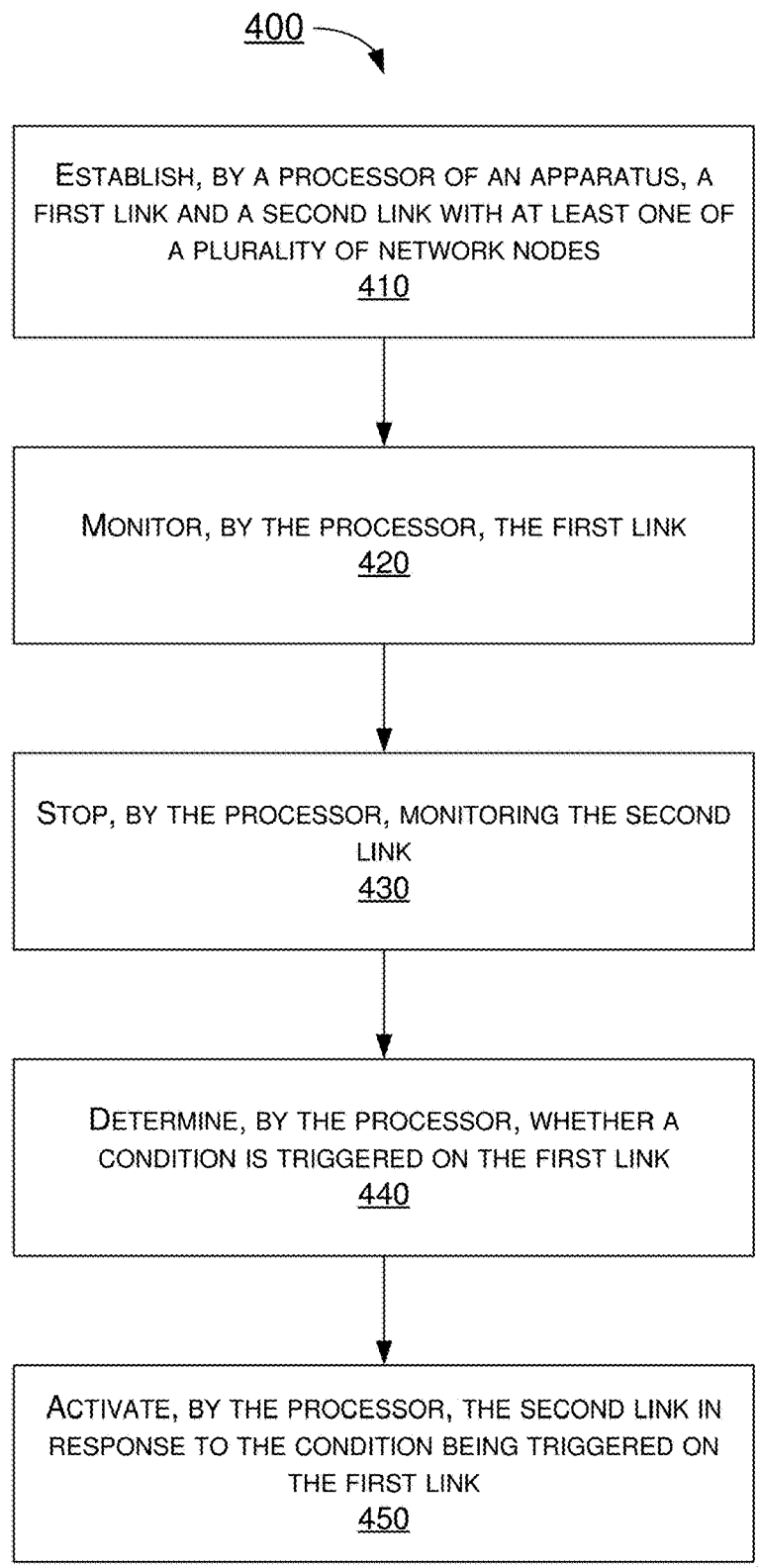
FIG. 4 is a flowchart of an example process in accordance with an implementation of the present disclosure.

FIG. 4 illustrates an example process 400 in accordance with an implementation of the present disclosure. Process 400 may be an example implementation of scenarios 100 and 200, whether partially or completely, with respect to power-efficient mechanism for multi-link operation with the present disclosure. Process 400 may represent an aspect of implementation of features of communication apparatus 310. Process 400 may include one or more operations, actions, or functions as illustrated by one or more of blocks 410, 420, 430, 440 and 450. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 establishing a first link and a second link with at least one of a plurality of network nodes. Process 400 may proceed from 410 to 420.

At 420, process 400 may involve processor 312 monitoring the first link. Process 400 may proceed from 420 to 430.

At 430, process 400 may involve processor 312 stopping monitoring the second link. Process 400 may proceed from 430 to 440.

At 440, process 400 may involve processor 312 determining whether a condition is triggered on the first link. Process 400 may proceed from 440 to 450.

At 450, process 400 may involve processor 312 activating the second link in response to the condition being triggered on the first link.

In some implementations, in stopping monitoring the second link, process 400 may involve processor 312 deactivating a cell, deactivating a carrier, switching a carrier to a dormant state, switching a carrier to a bandwidth part without PDCCH reception, or stopping monitoring a PDCCH.

In some implementations, in activating the second link, process 400 may involve processor 312 activating a cell, activating a carrier, switching a carrier to an active state, switching a carrier to a specific bandwidth part, or starting monitoring a PDCCH.

In some implementations, the condition may comprise at least one of presence of a downlink or uplink activity on a PDCCH, entry into a specific bandwidth part, reception of a network indication, transmission of a specific amount of data, transmission of a specific type of traffic, and reception of a wakeup indication.

In some implementations, process 400 may involve processor 312 initiating an inactivity timer. Process 400 may further involve processor 312 stopping monitoring the second link when the inactivity timer is expired.

In some implementations, process 400 may involve processor 312 transmitting an indication to inform at least one of the network nodes that the second link is activated.

In some implementations, process 400 may involve processor 312 entering into a power saving state on the first link. Process 400 may further involve processor 312 stopping monitoring the second link in response to the entering.

In some implementations, the first link may be configured with DRX. The second link may not be configured with the DRX.

In some implementations, process 400 may involve processor 312 initiating an inactivity timer. Process 400 may further involve processor 312 entering into a short DRX period on the second link when the inactivity timer is expired. Process 400 may further involve processor 312 initiating a short DRX cycle timer after entering the short DRX period. Process 400 may further involve processor 312 stopping monitoring the second link when the short DRX cycle timer is expired.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   establishing, by a processor of an apparatus, a first link and a second link with at least one of a plurality of network nodes;
   monitoring, by the processor, the first link;
   determining, by the processor, whether a condition is triggered on the first link; and
   activating, by the processor, the second link at beginning of a next discontinuous reception (DRX) ON duration in response to the condition being triggered on the first link,
   wherein the activating of the second link comprises:
      initiating an inactivity timer after activating the second link or after receiving data on the second link;
      keeping the second link activated before expiration of the inactivity timer;
      upon expiration of the inactivity timer, entering into a short DRX period on the second link to periodically monitor the second link in the DRX ON duration based on a short DRX cycle;
      initiating a short DRX cycle timer after entering the short DRX period; and
      upon expiration of the short DRX cycle timer, stopping monitoring the second link.

2. The method of claim 1, wherein the stopping of monitoring the second link comprises performing at least one of:
   deactivating a cell,
   deactivating a carrier,
   switching a carrier to a dormant state,
   switching a carrier to a bandwidth part without physical downlink control channel (PDCCH) reception, and
   stopping monitoring a PDCCH.

3. The method of claim 1, wherein the activating of the second link comprises performing at least one of:
   activating a cell,
   activating a carrier,
   switching a carrier to an active state,
   switching a carrier to a specific bandwidth part, and
   starting monitoring a physical downlink control channel (PDCCH).

4. The method of claim 1, wherein the condition comprises at least one of presence of a downlink or uplink activity on a physical downlink control channel (PDCCH), entry into a specific bandwidth part, reception of a network indication, transmission of a specific amount of data, transmission of a specific type of traffic, and reception of a wakeup indication.

5. The method of claim 1, further comprising:
   initiating, by the processor, an inactivity timer; and
   stopping, by the processor, monitoring the second link when the inactivity timer is expired.

6. The method of claim 1, further comprising:
   transmitting, by the processor, an indication to inform at least one of the network nodes that the second link is activated.

7. The method of claim 1, further comprising:
   entering, by the processor, into a power saving state on the first link; and
   stopping, by the processor, monitoring the second link in response to the entering.

8. The method of claim 1, wherein the first link is configured with discontinuous reception (DRX), and wherein the second link is not configured with the DRX.

9. The method of claim 1, wherein the DRX ON duration occurs after triggering of the condition by a time delay.

10. An apparatus, comprising:
    a transceiver capable of wirelessly communicating with a plurality of network nodes of a wireless network; and
    a processor communicatively coupled to the transceiver, the processor capable of:
       establishing, via the transceiver, a first link and a second link with at least one of the network nodes;
       monitoring, via the transceiver, the first link;
       determining whether a condition is triggered on the first link; and
       activating the second link at beginning of a next discontinuous reception (DRX) ON duration in response to the condition being triggered on the first link,
    wherein, in activating the second link, the processor performs operations comprising:
       initiating an inactivity timer after activating the second link or after receiving data on the second link;
       keeping the second link activated before expiration of the inactivity timer;
       upon expiration of the inactivity timer, entering into a short DRX period on the second link to periodically monitor the second link in the DRX ON duration based on a short DRX cycle;
       initiating a short DRX cycle timer after entering the short DRX period; and
       upon expiration of the short DRX cycle timer, stopping monitoring the second link.

11. The apparatus of claim 10, wherein, in stopping monitoring the second link, the processor is capable of performing at least one of:
    deactivating a cell,
    deactivating a carrier,
    switching a carrier to a dormant state,
    switching a carrier to a bandwidth part without physical downlink control channel (PDCCH) reception, and
    stopping monitoring a PDCCH.

12. The apparatus of claim 10, wherein, in activating the second link, the processor is capable of performing at least one of:
    activating a cell,
    activating a carrier,
    switching a carrier to an active state,
    switching a carrier to a specific bandwidth part, and
    starting monitoring a physical downlink control channel (PDCCH).

13. The apparatus of claim 10, wherein the condition comprises at least one of presence of a downlink or uplink activity on a physical downlink control channel (PDCCH), entry into a specific bandwidth part, reception of a network indication, transmission of a specific amount of data, transmission of a specific type of traffic, and reception of a wakeup indication.

14. The apparatus of claim 10, wherein the processor is further capable of:
    initiating an inactivity timer; and
    stopping monitoring the second link when the inactivity timer is expired.

15. The apparatus of claim 10, wherein the processor is further capable of:

transmitting, via the transceiver, an indication to inform at least one of the network nodes that the second link is activated.

16. The apparatus of claim 10, wherein the processor is further capable of:
    entering into a power saving state on the first link; and
    stopping monitoring the second link in response to the entering.

17. The apparatus of claim 10, wherein the first link is configured with discontinuous reception (DRX), and wherein the second link is not configured with the DRX.

18. The apparatus of claim 10, wherein the DRX ON duration occurs after triggering of the condition by a time delay.

* * * * *